United States Patent [19]

Toupin

[11] Patent Number: 5,212,680
[45] Date of Patent: May 18, 1993

[54] MASS STORAGE DEVICE EMPLOYING ARRAY OF TRANSDUCERS "COCKED" IN RELATION TO RECIPROCAL MOVEMENT AXIS

[75] Inventor: Richard A. Toupin, Islamorada, Fla.

[73] Assignee: International Business Machines Corporation, Armonk, N.Y.

[21] Appl. No.: 775,627

[22] Filed: Oct. 10, 1991

[51] Int. Cl.$^5$ .............................. G11B 5/00; G11B 5/48
[52] U.S. Cl. ......................................... 369/99; 360/63; 360/88
[58] Field of Search ................ 369/99, 100, 101, 110, 369/112, 126, 127, 135, 93; 360/63, 88

[56] References Cited

U.S. PATENT DOCUMENTS

| | | | |
|---|---|---|---|
| 4,636,893 | 1/1987 | McClure | 360/101 |
| 4,750,060 | 6/1988 | Nazakawa et al. | 360/66 |
| 4,800,258 | 1/1989 | Suzuki et al. | 235/479 |

FOREIGN PATENT DOCUMENTS 60-478 3/1981 European Pat. Off. .
1125773 5/1989 Japan .................................... 369/99

*Primary Examiner*—Paul M. Dzierzynski
*Assistant Examiner*—Jim Beyer
*Attorney, Agent, or Firm*—Perman & Green

[57] ABSTRACT

A mass storage device includes a media sheet supported on a substrate for storing digital data bit manifestations and a planar, integrated array of transducers arranged in rows and columns. The array is mounted in registration with the substrate, and its columns of transducers are oriented at an acute angle with respect to a movement axis. A piezoelectric device provides relative movement between the substrate and the array of transducers along the movement axis. Circuitry accesses rows of transducers in each column in a timed manner, so as to operate each transducer in a column at the time the transducer is adjacent a row of stored digital data in the media sheet. The acute angular relationship between the transducer array and the movement axis enables digital data to be stored in the media sheet in a fraction of the surface area occupied by an individual transducer and its associated circuitry.

10 Claims, 3 Drawing Sheets

MASS STORAGE DEVICE EMPLOYING ARRAY OF TRANSDUCERS "COCKED" IN RELATION TO RECIPROCAL MOVEMENT AXIS

FIELD OF THE INVENTION

This invention relates to high density digital information storage devices and, more particularly, to a high density storage device which employs reciprocal motion between read/write transducers and a recording media.

BACKGROUND OF THE INVENTION

Notwithstanding the high memory densities of modern VLSI random access memory (RAM) chips, most of the chip area is still consumed by wires, transistors, off-chip drivers and other essential devices and circuitry. The essential memory elements, occupy only a small percentage of the available silicon wafer area. As industry's ability to construct smaller line widths and semiconductor features has improved, memory densities of such chips have improved, however, limits are now being reached that render it increasingly difficult to achieve substantially higher levels of integration.

The most widely used mass memory device is the disk file that can access between ten to one hundred or more megabytes per read/write element. While the capacity of present disk drives is large and the cost per byte of storage is much less than RAM, recording densities remain relatively low. This is due to the difficulties of implementing cost-effective read/write mechanisms that reliably operate at the high speeds of relative motion that occur in the latest disk drive structures. Thus, disk drive random access times are nowhere near RAM access times.

In general, the smaller the number of bits addressed by each read/write element of a disk drive, the smaller is the time for randomly accessing a bit or word. The maximum time to access, randomly, bits on a given track of a disk memory can also be further reduced by disposing additional read/write elements along different radii or over a single track. This adds both additional mechanical complication and cost to the disk system.

In VLSI RAM, the read/write elements are numerous and so are wires. On a RAM chip, while the wires are maintained as short as possible to increase the data transfer rate, the wires still consume the greater portion of the area of the chip.

The challenge for disk manufacturers has been to remain cost competitive with VLSI RAM, while attempting to reduce, if possible, the great disparity in their random transfer rates of data. Thus, while RAMs exhibit transfer rates in the fifty to two hundred nanosecond range, disk drive access times are still in the low millisecond range.

The prior art has attempted to bridge the VLSI RAM/disk drive access time disparity by providing reciprocal oscillatory motion between magnetic read/write heads and a magnetic surface. In U.S. Pat. No. 4,636,893 to McClure, a planar array of magnetic heads is mounted on a piezoelectric structural member. The heads are in contact with a magnetic medium coated onto a stationary support. A repetitive ramp voltage is applied to the piezoelectric structural member, causing repetitive linear extensions of the member with respect to the magnetic medium. This action enables magnetic recording to be implemented by proper energization of the magnetic heads.

The McClure structure suffers from a number of deficiencies. First, it is complex and requires a multiplicity of assembled head structures. McClure's recording density is dependent upon the size of his recording heads and, thus is limited in the number of bit patterns which can be placed on the magnetic medium. Furthermore, the number of magnetic heads which can be included in McClure's head structure will be limited by the relatively high power dissipation experienced in magnetic write actions.

Accordingly, it is an object of this invention to provide an improved mass storage device that enables extremely high density recording of digital data.

It is another object of this invention to provide a mass storage device that employs oscillatory relative motion between a read/write head array and a record surface.

It is yet another object of this invention to provide an improved mass storage device that utilizes an integrated read/write array structure.

SUMMARY OF THE INVENTION

A mass storage device includes a media sheet supported on a substrate for storing digital data bit manifestations and a planar, integrated array of transducers arranged in rows and columns. The array is mounted in registration with the substrate, and its columns of transducers are oriented at an acute angle with respect to a movement axis. A piezoelectric device provides relative movement between the substrate and the array of transducers along the movement axis. Circuitry accesses rows of transducers in each column in a timed manner, so as to operate each transducer in a column at the time the transducer is adjacent a row of stored digital data in the media sheet. The acute angular relationship between the transducer array and the movement axis enables digital data to be stored in the media sheet in a fraction of the surface area occupied by an individual transducer and its associated circuitry.

DETAILED DESCRIPTION OF THE INVENTION

Figure 1:
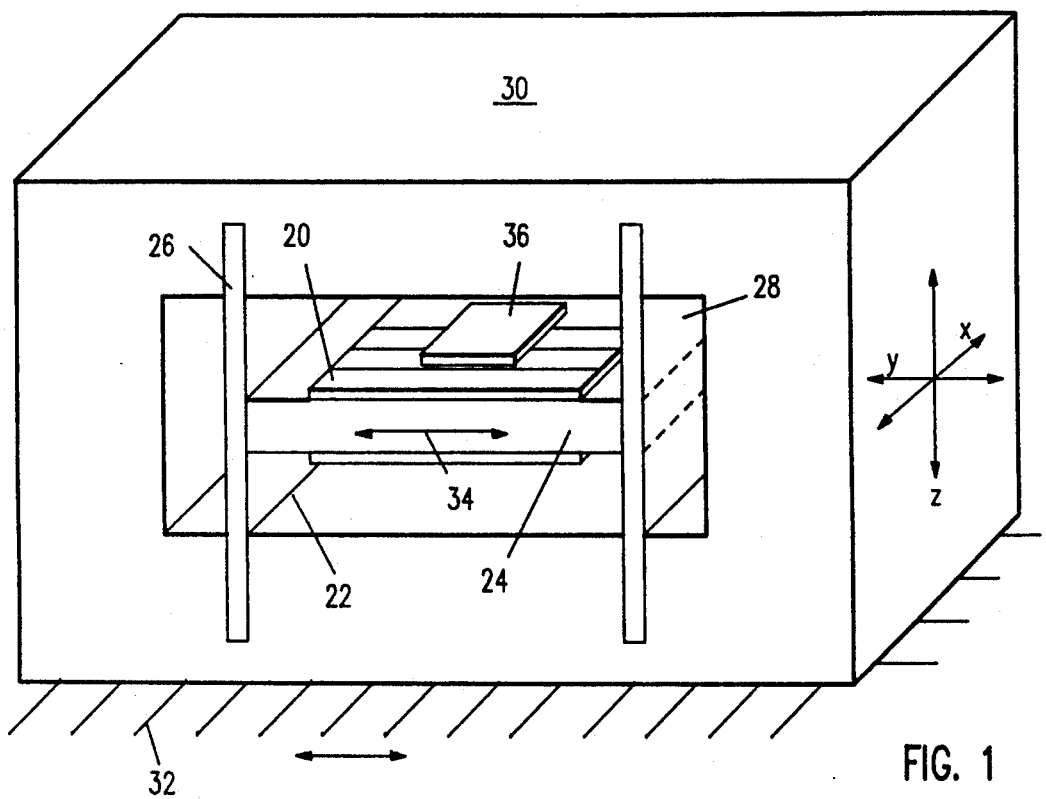
FIG. 1 is a perspective view of a first embodiment of the invention.

Referring now to FIG. 1, a pair of record media sheets 20 and 22 are supported on opposite sides of a record platform 24. Two opposing edges of record platform 24 are attached to a pair of identical, thin, sheets or struts 26 and 28 respectively. Each of sheets 26 and 28 is rigidly mounted, at its extremities, in a relatively more massive and rigid housing 30. Each of sheets 26 and 28 is a piezoelectric bimorph exhibiting a piezoelectric-driven elastic action. Housing 30 acts as an inertial "immovable" frame whose motions are microscopic when compared to the induced motion of record platform 24. By proper energization of sheets 26 and 28, record platform 24 is free to vibrate relative to housing 30 in its own plane and in a direction normal to elastic sheets 26 and 28 (see arrows 34). An integrated transducer array 36 is maintained in contact with record media 20, but is rigidly fixed so that when record platform 34 vibrates, relative motion occurs between transducer array 36 and the surface of record media 20. An identical transducer array is placed adjacent record media 22, but is hidden in the view of FIG. 1.

Figure 2:
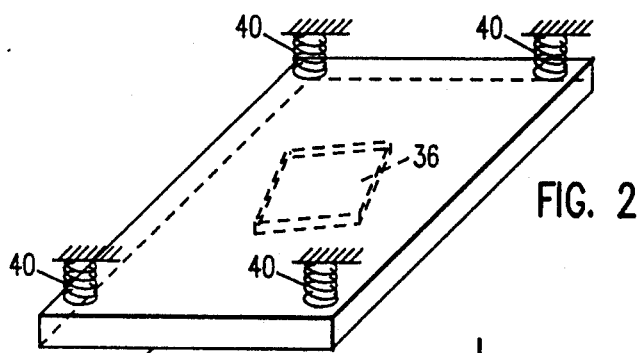
FIG. 2 is a perspective view of the read/write transducer array structure and its supporting circuit board, as seen from above.

Transducer array 36 is maintained in contact with record media surface 20 by a circuit carrier 38 (see FIG. 2). Transducer array 36 is mounted on the underside of circuit carrier 38. The lateral extents of circuit carrier 38 extend out from housing 30 and are biased in a downward direction by a plurality of elastic members 40, that are in turn biased against a rigid surface. The active face of transducer array 36 is thus forced against the surface of record media 20, thereby enabling read/write actions to occur when relative motion is present therebetween.

Figure 3:
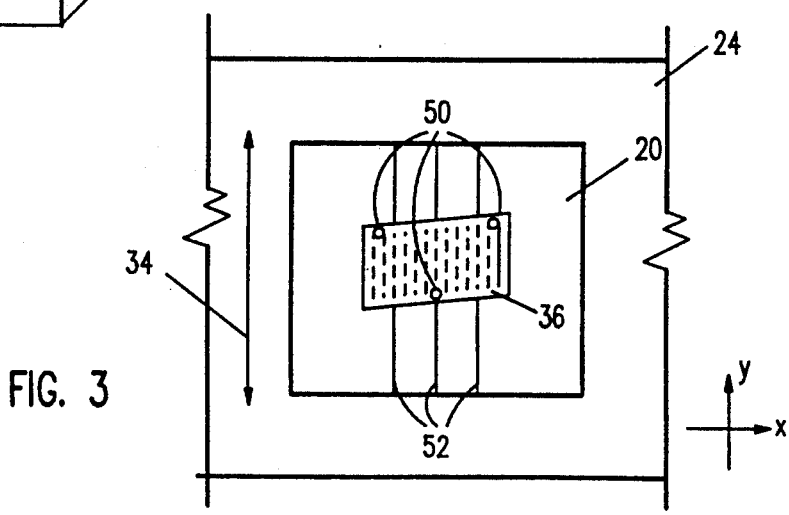
FIG. 3 is a plan view of the read/write transducer array structure in place over a record media sheet.

In FIG. 3, circuit carrier 38 has been removed so as to show the relationship between transducer array 36 and underlying record media 20. A plurality of pins 50 extend from the contact surface (hidden) of transducer array 36 and engage guide channels 52 that are formed in the surface of record media sheet 20. In this manner, the geometric relationship between transducer array 36 and record media sheet 20 is maintained, as record media sheet 20 oscillates along axis of movement 34. Guide pins 50 constrain the movement of transducer 36 to a linear direction that is coextensive with axis 34. The height of guide pins 50 enables the read/write gaps to be precisely controlled over the entire surface of transducer array 36. It is to be noted that transducer array 36 is "cocked" at an acute angle with respect to axis 34. The significance of this relationship will become apparent during the discussion of FIGS. 5 and 6.

The structure shown in FIGS. 1–3 has a wide spectrum of frequencies of free vibration. With each frequency, there is associated a mode shape, and a rate of decay due to internal friction. The spectrum of frequencies of free vibration, the shape of the modes and their damping coefficients depend on the shape, the density of mass, the elastic moduli, and the internal friction of all the parts of the structure. These parameters can be chosen to achieve a desired frequency spectrum, decay rate and mode shape. It is preferable to choose the parameters so that the lowest frequency of free vibration of the structure has a prescribed value, is only slightly damped and has a mode shape closely approximating simple unidirectional motion of record platform 34 in its own plane.

For a given length of sheets 26 and 28 and the mass of record platform 24, the frequency of free vibration of platform 24 (in its own plane and normal to the supporting sheets) is a continuous function of the thickness of the sheets. To increase the frequency of this mode, the sheets need only to be thickened. To decrease the frequency, the sheets should be thinned. The sheets must be long enough to sustain vibration of platform 24 with an amplitude of motion, on the order of a few hundred microns.

Figure 4:
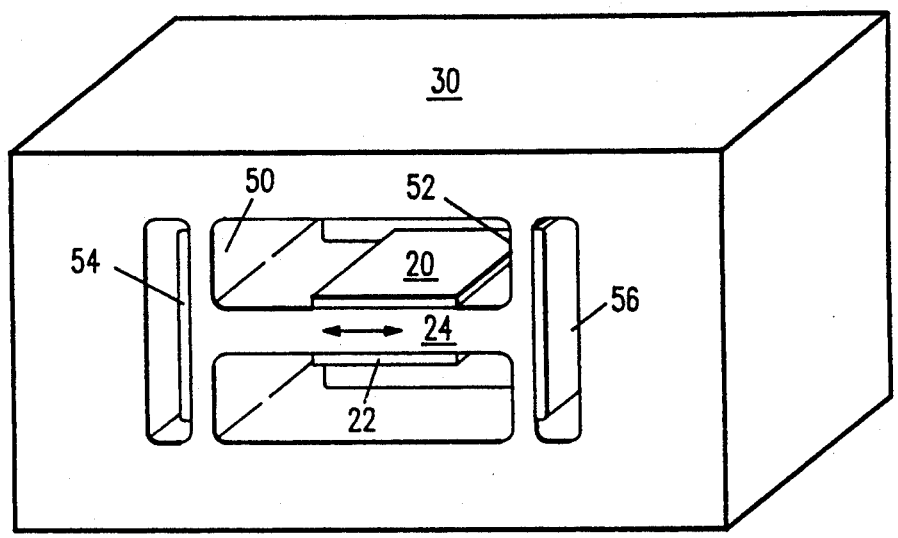
FIG. 4 is an isometric view of a further embodiment of the invention.

In FIG. 4, a modification is shown to the structure of the invention. Record platform 24 is formed as an integral portion of a pair of struts 50 and 52. On opposite sides of struts 50 and 52 are positioned a pair of piezoelectric actuators 54 and 56 which, by proper excitation and phasing, can cause a desired vibration mode in record platform 24. In the view of FIG. 4, the transducer arrays and their supporting structures have been removed.

Simple harmonic oscillation of record platform 24, at or near its lowest frequency of free vibration, can be sustained by application of a periodic voltage across piezoelectric actuators 54 and 56. Through the use of suitable feedback, record platform 24 can be driven at precisely its lowest frequency of free vibration by extremely small applied forces and with low power consumption.

The construct shown in FIG. 4 is "unibody" in nature and can be machined or molded as a single piece of suitable elastic material. It is not only inexpensive to fabricate, but avoids bonding of several parts and resultant stress concentrations at joints and sharp corners which might occur in the structure of FIG. 1. It further minimizes relative displacements that might be caused by unequal expansions/contractions that would result from unequal thermal coefficients.

Prior to discussing the configuration of transducer array 36 and its ability to create highly dense bit patterns, methods for recording and reading such data will be considered. A preferred method for recording data onto and reading data from record media sheet 20 is electro-optic. An electro-optic system requires that each read/write transducer within transducer array 36 include both a laser photodiode and a juxtaposed photodetector. Record media sheet 20 is preferably an extremely thin layer of magnetic material whose surface can be modified by an appropriately focused optical beam. A thin layer of magnetic material enables a relatively low-power laser diode to write data into record media 20. Reading is accomplished by sensing changes in a reflected beam that occur as the result of electro-optic surface affects (e.g. Kerr effect, polarization rotation, etc.).

Other methods of recording are also acceptable, although not as preferred. For instance, the mass memory described herein may be used as a read-only memory, with data written onto record media 20 using magnetic recording techniques. Each readhead within transducer array 36 would then constitute only a small gap structure to enable the magnetic field from the surface of record media 20 to be sensed. The read elements could also be magneto-resistive. Furthermore, if the system is maintained at superconducting temperatures, magnetic writing could also be accomplished, without an excessive heat buildup.

A further recording technique which may be employed involves the use of a thin film of an electretic material that can retain a non-uniform charge distribution over a long period. Such charge distributions can be employed as a read-only memory.

Figure 5:
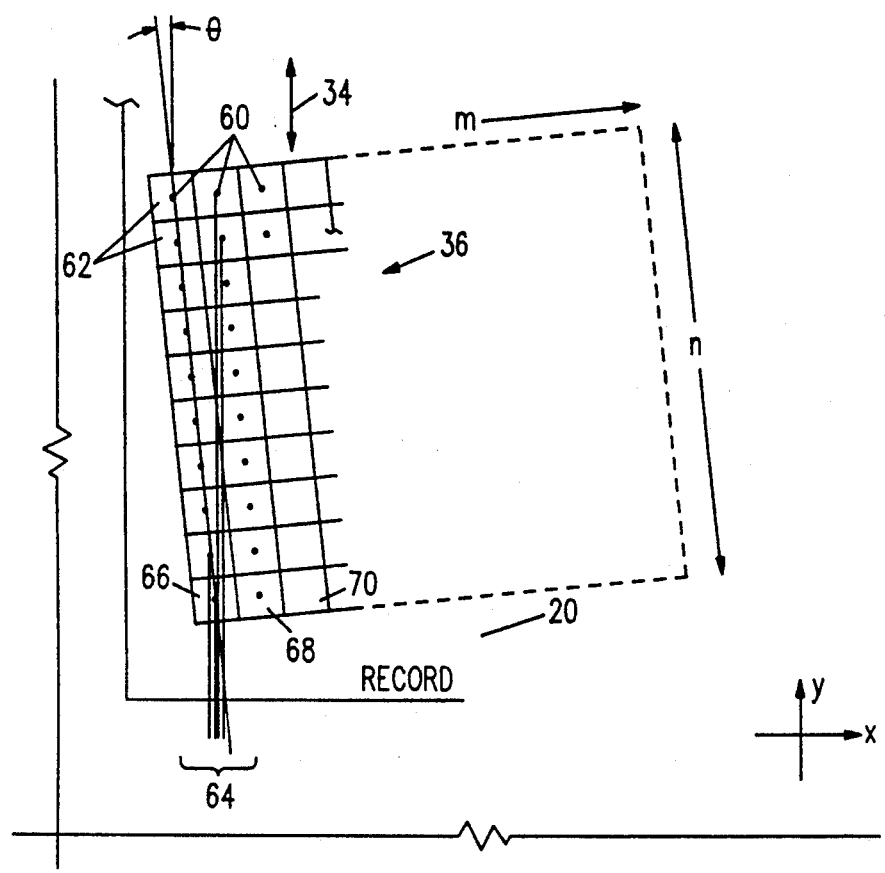
FIG. 5 is an expanded view of the read/write transducer array structure, as seen from above and over a record media sheet.

Turning now to FIG. 5, the structure of integrated transducer array 36 will be considered. As above indicated, the vast majority of area of any integrated transducer structure is taken up by interconnecting wiring and active devices. The actual data read/write head occupies only a very small fraction of a transducer area. In FIG. 5, a portion of transducer array 36 is shown, as viewed from its uppermost surface, looking downwardly. Transducer array 36 is illustrated as "transparent" so that underlying transducer regions 62 can be visualized.

Each transducer 60 (shown schematically) occupies a small portion of an individual transducer region 62. Transducer regions 62 are arranged in a N by M array. It is to be noted that the N by M array is rectangular, regular and is "cocked" at an acute angle θ with respect to axis 34. When record media 20 moves with respect to transducer array 36, each transducer 60 plots a track 64 across record 20 that is parallel to axis 34. Cocking of transducer array 36 at an angle θ with respect to axis 34 enables recording tracks 64 to be spaced apart at a distance that is not determined by the dimensions of transducer region 62, but rather is determined by the dimensions and characteristics of transducers 60. In this manner, an extremely dense packing of read/write tracks results.

In general, the tangent of the cock angle θ is preferably set approximately equal to the ratio of the transverse linear dimension of a data track (i.e. equivalent to the width of a transducer 60) to the linear dimension of a transducer region 62. (It may be increased somewhat to increase the distance between neighboring tracks.) In the above example, this ratio is 1/10. This 1/10 ratio would be the same for a 1000×1000 array of read/write heads.

In a 1000×1000 array of transducers 60, the physical arrangement of elements will be as follows. Each track is linear, approximately of overall length equal to the span of the transducer array, and is partitioned into data track segments, with each segment read and written by one transducer 60. With a cock angle tangent equal to 1/10, the number of data cells in each track segment is 100 and each transducer 60 accesses those 100 cells and those only. Assuming memory cell sizes of approximately 1 micron, the amplitude of the vibrating motion is only about 200 microns, and covers 200 or so cells. Thus, every 100 cells in a given column of data is accessed by a different transducer 60. Some of the data cells are visited by more than one transducer, but data is written or read by only one.

The plurality of transducer 60 visiting each data cell is caused by a need for overlapping during a "dwell" time. Dwell time is the fraction of a period of the motion during which the direction of motion is changed from one direction to another. The relative velocity of transducers and data cells is exactly zero at two instants during each cycle, and also reaches some maximum velocity two instants each cycle. Thus for those methods of recording like magnetic induction recording, (not magneto-resistive reading), where interaction is proportional to the relative velocity between a record and transducer, it is necessary to have such a dwell time during which no data are written or read. Dwell is not necessary for magneto-resistive reading which does not require relative motion between the record and transducer.

Figure 6:
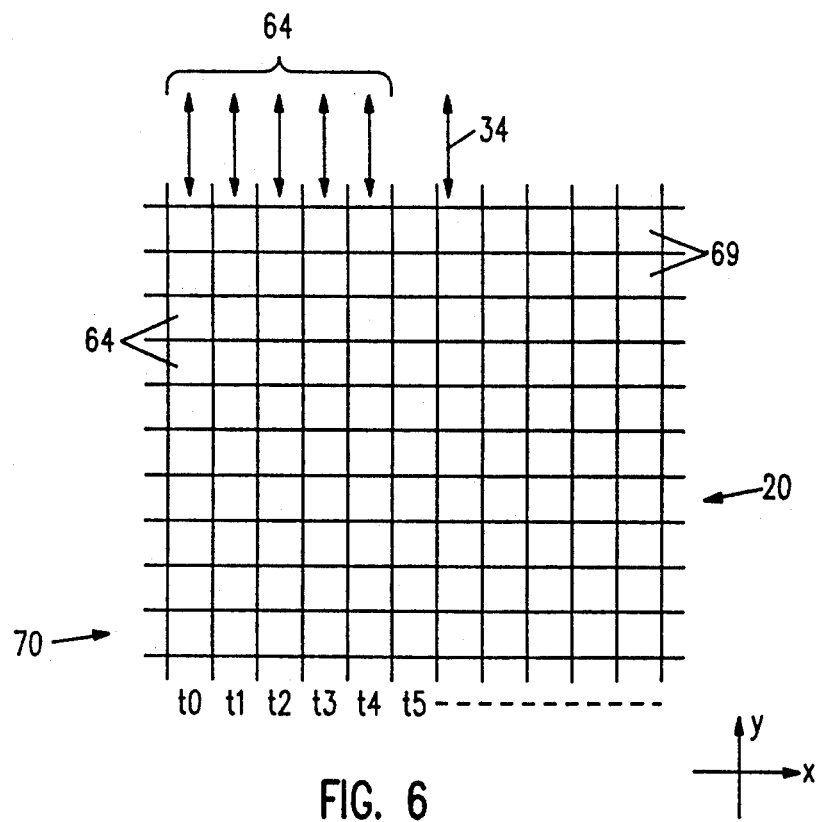
FIG. 6 is a schematic view of bits recorded on the record media sheet of FIG. 4.

In FIG. 6 a plan view is shown of an array of memory cells 69 created in record media 20 through the action of transducer array 36. Tracks 64 are shown as if transducers 60 in column 66 were passing over the memory cell array. If it is assumed that relative motion between record media 20 and transducer array 36 causes column 66 of transducers 60 to follow tracks 64, a row of cells (e.g. row 70) in the cellular memory array can be read or written as follows. Each transducer 60 will follow a track 64 over the cellular memory array. However, each transducer 60 in a column will arrive at a row of memory cells at a different time from any other transducer 60 in the same column of transducers. Thus, if row 70 of memory cells in FIG. 6 is to be written or read, the lower left-most memory cell 69 would be read at an initial time (e.g. t0) with the next rightmost cell in row 70 being read at a later time t1, followed by succeeding cells along row 70 at succeeding times, t2, t3, t4, etc. Through proper synchronization, each column of transducers 60 (e.g. column 66) can be caused to either read or write a row of memory cells on a time staggered basis. This action enables the memory cells to be recorded "side by side" and their packing density is thus mainly controlled by the read/write characteristics of each transducer 60.

As an example, the scale of integrated transducer array 36 is such that each transducer region 62 occupies a 10×10 micron area, with each transducer 60 only occupying a one micron square in the center of a transducer region 62. Not depicted are the wires, transistors, and other components which occupy the rest of the area of each transducer region 62.

If the peak-to-peak amplitude of oscillations of record platform 34 approximate about one hundred microns, then in every cycle of oscillation, the time integrated projection onto record media 20 of each transducer 60 will completely cover a contiguous, almost square portion of record media 20 (about the size of transducer array 36}. By maintaining the motion record platform 34 in the simple harmonic regime, the speed of the read/write gap relative to the surface of record media 20 will not be uniform, but will be sinusoidally periodic. However, each point of record media 20 along the path of a given transducer 60 will be visited twice by a transducer 60 during each period of oscillation of record platform 34. Thus, at intervals of time, centered about the instant of maximum speed between record media 20 and transducer array 36, the speed will be nearly uniform over approximately one quarter of the period of oscillation. As a result, twice during each period of oscillation of record platform 34, transducer array 36 has an opportunity to dump its contents to a portion of the record or to retrieve, concurrently, data previously recorded.

It is to be noted that there are two main control parameters in a vibrational system such as shown in FIG. 4. They are the frequency and amplitude of the voltage applied to the struts that support record platform 34. All other degrees of freedom of motion of record media 20 with respect to transducer array 36 are governed by contact forces between guide pins 50 and channels 52 in record media 20. Only one or a few of the transducers 60 are required to supply the feedback data for control parameters.

Figure 7:
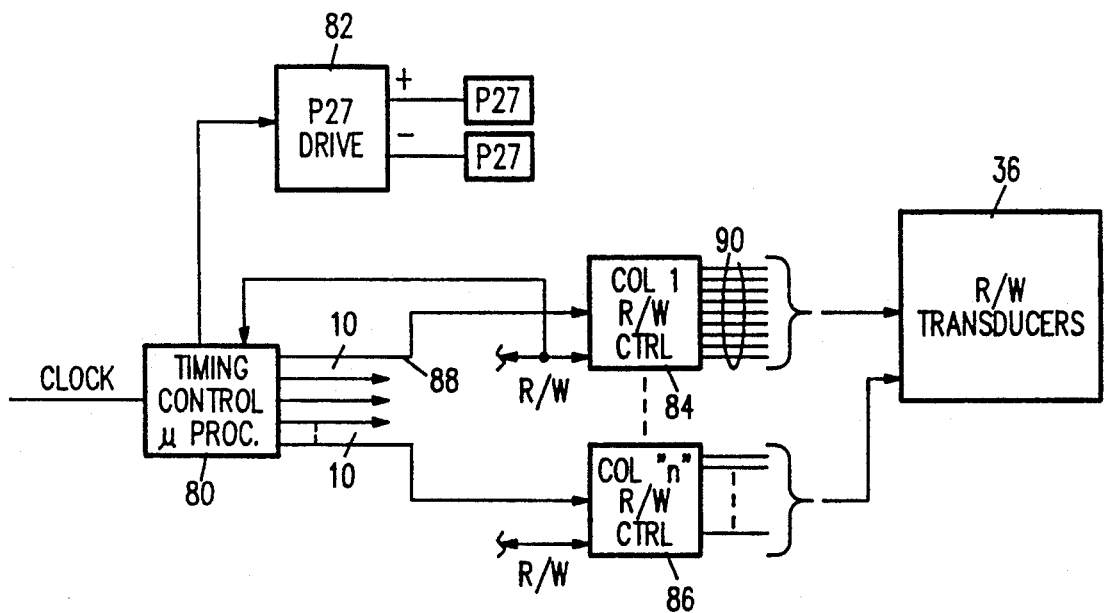
FIG. 7 is a block diagram of a timing control circuit to enable digital data to be either written or read via the read/write transducer array structure.

A block diagram of a timing control circuit to enable operation of the mass media is shown in "FIG. 7. A timing control microprocessor 80 operates PZT drive circuit 82 in synchronism with an applied clock signal. Each column of transducers 60 has an individual read/write control circuit 84, 86 etc. Timing control microprocessor 80 is connected to each of those control circuits by a ten line cable 88 which provides a sequence of ten timing signals to enable staggered operation of transducers along a column. Timing control microprocessor 80 thus places upon cable 88 a series of pulses which enable read/write control module 84 to operate its I/O lines 90 at the proper time and in sequence. As a result, each transducer. Within transducer array 36 is enabled to operate at the proper time, under control of a level on an I/O line 90. Each of the other columns within transducer array 36 is operated similarly, at a slightly changed timing to take into account the "cock" angle θ. Circuitry for causing writing of data signals and reading thereof is not shown. Such circuitry is conventional and synchronized by control timing levels from timing control microprocessor 80.

It should be understood that the foregoing description is only illustrative of the invention. Various alternatives and modifications can be devised by those skilled in the art without departing from the invention. For instance, while relative movement between transducer array 36 and record media 20 has been disclosed as being, in part, controlled by a pin and groove arrangement, those skilled in the art will realize that there are other methodologies to achieve such control. Thus, the tunnelling scanning microscope mechanism teaches how to monitor and to control a gap between a surface and a transducer. Furthermore, the cock angle and transverse alignment along the X coordinate in FIG. 3 can be monitored by signals from a few designated servo cells of the array and the gap and position adjusted using piezoelectric actuators. These position control methodologies are operable as a result of the slow relative motions and small displacements involved. Because the track length of a given transducer is only a few hundred microns, the relative speed, even at a vibration frequency of 20000 Hz, is only 3 or 4 meters per second as contrasted to 60 meters per second in a Winchester disk file. Accordingly, the present invention is intended to embrace all such alternatives, modifications and variances which fall within the scope of the appended claims.

I claim:

1. A mass storage device, comprising:
   a substrate;
   a media sheet supported by said substrate, for storing digital bit manifestations;
   a planar, integrated array of transducers arranged in rows and columns, said columns oriented at an acute angle with respect to a movement axis;
   means for providing relative reciprocal movement between said substrate and said array of transducers along said movement axis; and
   means for accessing transducers in each said column in a timed manner to operate each said transducer in a column at a time it is adjacent a row of stored digital bit manifestations.

2. The mass storage device as recited in claim 1, wherein said acute angle enables a plurality of digital data bit manifestations to be stored in said media sheet in a surface area that is a fraction of the surface area occupied by a transducer in said array of transducers.

3. A mass storage device as recited in claim 1 wherein said array of transducers is fixed and said reciprocal movement means causes oscillatory movement of said substrate along said movement axis.

4. A mass storage device as recited in claim 1, further comprising:
   a frame; and resilient means for supporting said substrate within said frame, whereby the operation of said reciprocal movement means causes said substrate to oscillate in conjunction with said resilient means, along said movement axis.

5. The mass storage device as recited in claim 4 wherein said reciprocal oscillatory movement means comprises:
   piezoelectric means mounted in contact with said resilient means, and wherein said media sheet is mounted between said resilient means on said substrate, said movement axis intersecting said piezoelectric and resilient means at an orthogonal angle.

6. The mass storage device as recited in claim 2, wherein said planar integrated array of transducers is provided with a plurality of extending pins that interact with a like plurality of channels on said substrate, whereby relative movement, between said array of transducers and said media sheet, except along said movement axis, is confined by interaction between said pins and said channels.

7. The mass storage device as recited in claim 6 wherein said extending pins comprise three pins that are placed in a triangular arrangement on said array of transducers.

8. The mass storage device as recited in claim 2 wherein said means for accessing causes said transducers to record digital data manifestations in contiguous rows and columns on said media sheet.

9. The mass storage device as recited in claim 2 wherein each said transducer and its associated circuitry occupies a transducer region, the tangent of said acute angle being approximately equal to the ratio of a linear dimension of a transducer region to a linear dimension of a transducer within a said transducer region.

10. The mass storage device as recited in claim 3, wherein transducers in said array of transducers pass over memory cells in said media sheet twice during each reciprocal oscillatory movement, said means for accessing enabling operation of said transducers during each said pass.

* * * * *